S. HULL.
Attaching the Raker's Seat to Harvesters.
No. 13,147.  Patented June 26, 1855.
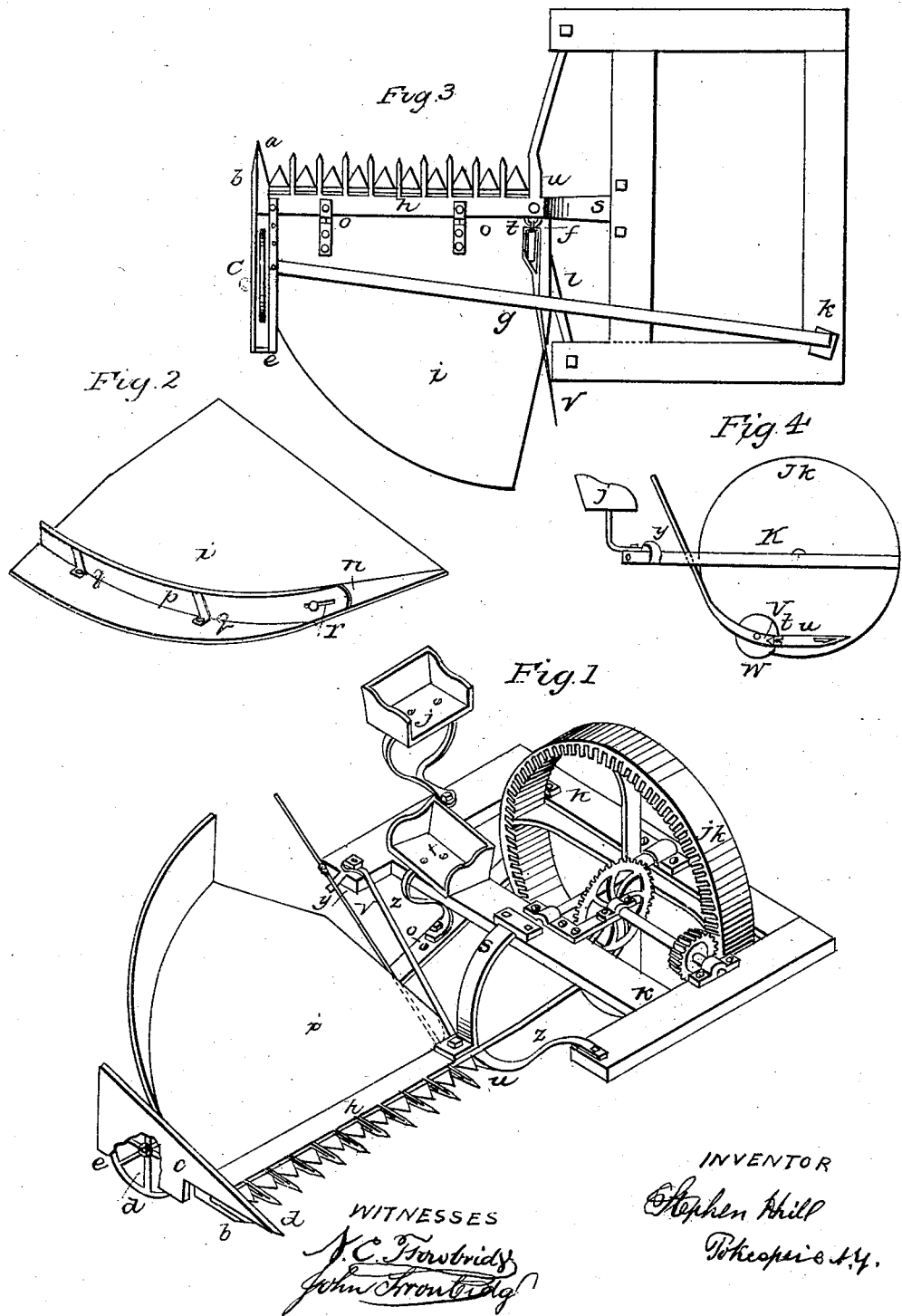

UNITED STATES PATENT OFFICE.

STEPHEN HULL, OF POUGHKEEPSIE, NEW YORK.

IMPROVEMENT IN ATTACHING THE RAKER'S SEAT TO HARVESTERS.

Specification forming part of Letters Patent No. 13,147, dated June 26, 1855.

*To all whom it may concern:*

Be it known that I, STEPHEN HULL, of the city of Poughkeepsie, in the State of New York, have invented a new and useful Improvement in Grain and Grass Harvesters, of which the following is a full and exact description.

Figure 1 is a perspective view. Fig. 2 is a sectional view of the guide or fender board as it is fastened on the platform. Fig. 3 is a plan view when inverted or turned over. Fig. 4 is a sectional view of the small wheel $w$ and lever $v$ as it is fastened to the back shoe and comes up near the driver's seat.

To enable others skilled in the art to make and use my invention, I will describe its construction and use.

I make the divider $a$ of a piece of timber about three by four inches square and about three feet long, and fasten it on the top of the outside iron shoe, $b$, loosely with a bolt. To the outside of the divider $a$, I fasten the forward end of the triangular plank $c$, for the purpose of holding the wheel $d$ (or rather the axle on which the wheel $d$ turns,) and also to prevent the grain from working in the wheel at the outside, as the axle on which the wheel turns is fastened on the inside of the triangular plank about two feet or a little less back of the outside shoe, $b$, by means of bolts through different holes, one above another, for the purpose of raising or lowering the platform and cutters, as may be desired, in order to cut the grain high or low, as the outer end of the finger-bar $h$ and the platform $i$ rest on this wheel. I fasten a piece of plank or board, $f$, to the forward end of the divider $a$, and extend it back over the wheel $d$ to keep the cut grain from falling on the wheel. I fasten the back end of the stick of timber $m$ to the foot of the post $e$, (which is bolted fast to the back end of the triangular plank $c$,) and the forward end I fasten to the finger-bar near the outer shoe, $b$, parallel with triangular plank and about five inches from it, to leave an open space for the wheel $d$ to run in between the platform $i$ and the triangular plank $c$, and hold the frame which supports the platform $i$ and wheel $d$ firmly to the finger-bar $h$. To this timber $m$ I fasten the bar $g$ about eighteen inches from the finger-bar $h$. I extend the bar $g$, on which the platform $i$ rests, from the inside of the platform, near where the grain falls on the platform, a little upward back of the driving-wheel $j k$, and fasten it to the frame $k$ outside of the driving-wheel by means of a bolt or other equivalent device to hold the platform at any desired height from the ground, and also to cause the weight of the platform to rest as much as possible on the frame $k$, outside of the driving-wheel $j k$.

I make the raker's seat $x$ in any of the common forms, and place or fasten it on the bar $g$, near where it passes under the inside of the main frame, by means of an iron or steel bar or other equivalent device that will raise the seat at a proper height above the platform and at a proper distance from where the grain falls on the platform $i$ to enable the raker to rake off the grain at the side of the platform in good condition for binding and with the greatest possible ease and dispatch. I place or fasten the raker's seat $x$ on the bar $g$ near the inside of the frame $k$, for the purpose of causing the weight of the raker to rest as much as possible on the frame $k$, outside of the driving-wheel, for the purpose of relieving the cutters or finger-bars of all unnecessary weight.

I fasten the guide or fender-board $p$ on the upper side of the back end of the platform by means of corner-irons $q\,q$ and slot $r$, for the purpose of making it adjustable, moving it forward when the grain is short and back when it is long. I also make a flange on or near the upper end of the elbow on the under side, the same as is made on upper side of the elbow $s$, so that it may be fastened on the upper side of the frame $k$, for the purpose of elevating the finger-bar for cutting grain when necessary. I also have a shoe cast on the back end of the inside shoe, $u$, to prevent it from running in the ground when backing the machine. To this shoe I fasten one end of the lever $v$, which is fastened to the axle of the small wheel $w$, which is used as a fulcrum for the lever to rest on. The lever bends up from the wheel and comes up near the driver's seat $j$, so that the driver, when on his seat, can press or pull back the lever with one hand and raise the cutters from the ground to enable them to pass over stones and other obstacles without injury, and also to enable the team to back and turn the machine more easily.

In Fig. 3 is represented the bar $g$, on which the platform $i$ rests, extended from the platform back of the driving-wheel and fastened to the frame $k$ outside of the driving-wheel, for the purpose of causing the weight of the platform to rest as much as possible on the frame outside of the driving-wheel. In Fig. 2 is represented the guide and fender-board $p$ as being made adjustable by means of corner-irons $q\ q$ and slot $r$. In Fig. 1 the cast-iron elbow is represented as being fastened on the upper side of the frame $k$ for the purpose of elevating the finger-bar $h$, so as to cut grain or grass at different heights. In Fig. 4 is represented the lever $v$ and wheel $w$ as being attached to the back shoe to enable the driver while on his seat to elevate the finger-bar at his pleasure; and in Fig. 3 the platform $i$ is represented as resting on the bar $g$ and fastened to finger-bar by means of hinges, so as to allow the platform to rise and fall without twisting the finger-bar. To these improvements, as above seen and set forth in the specification, I make no claim herein, they being the subject of separate applications.

Having thus set forth my improvements, I do not claim to be the original inventor of the raker's seat, nor of any of the different parts of the machine irrespective of the manner in which they are combined and fastened together; but What I do claim as my invention herein, and desire to secure by Letters Patent of the United States, is—

The placing or fastening of the raker's seat $x$ on the bar $g$ by means of a bar of iron or steel, or any other equivalent device, near the inside of the main frame, in such a manner that the weight of the raker when on his seat will rest on the bar $g$, substantially as herein set forth.

STEPHEN HULL.

Witnesses:
 N. C. TROWBRIDGE,
 JOHN TROWBRIDGE.